United States Patent Office.

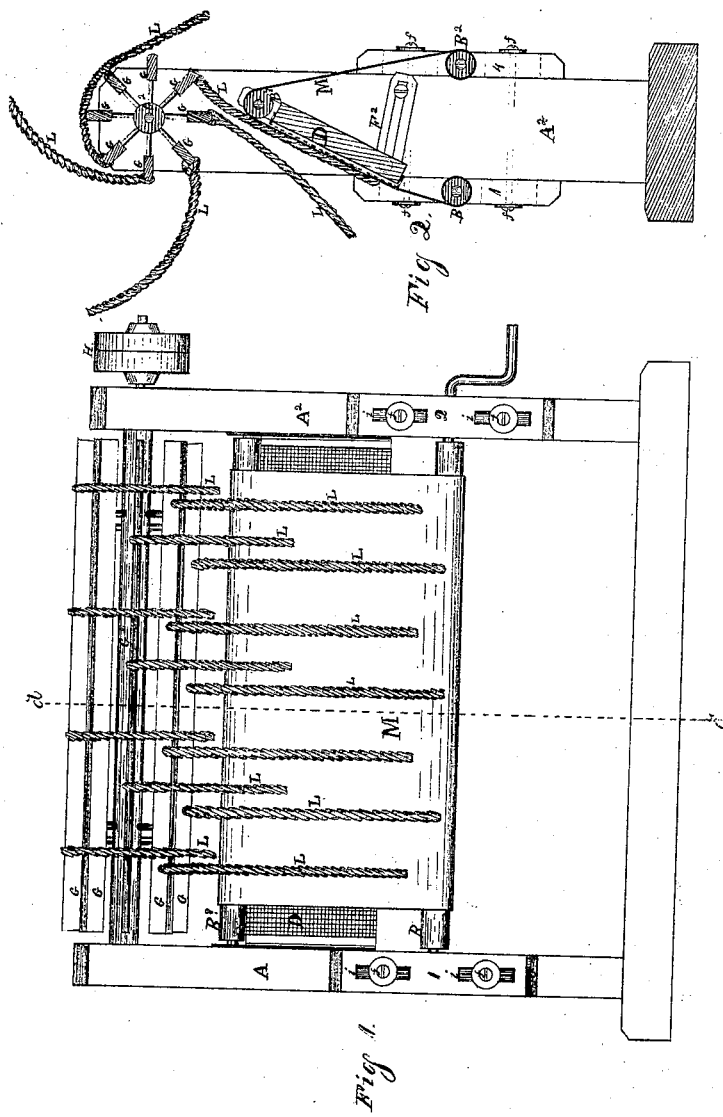

ROBERT TERRY AND FREDERICK W. HAFKEMEYER, OF CHICAGO, ILLINOIS.

Letters Patent No. 108,651, dated October 25, 1870.

IMPROVEMENT IN CARPET-CLEANERS.

The Schedule referred to in these Letters Patent and making part of the same.

*To all whom it may concern:*

Be it known that we, ROBERT TERRY and FREDERICK W. HAFKEMEYER, of Chicago, in the county of Cook and State of Illinois, have invented certain new and useful Improvements in Carpet-Cleaners; and we do hereby declare the following to be a full, clear, and exact description thereof, reference being had to the accompanying drawing making a part of this specification, in which—

Figure 1 is a side elevation of our invention, and

Figure 2, a vertical transverse section on line $d\ d$.

Similar letters of reference, where they occur in the separate figures, denote like parts.

Our invention relates to that class of carpet-cleaners wherein the carpet is operated upon by a system of rotating beaters; and The nature of our improvement consists—

First, in attaching the beaters to the wings of a rotating fan, whereby the current of air produced by the fan may remove the dust from the carpet as the same is loosened by the beaters.

Second, in passing the carpet around a system of cylinders and over an apron so arranged as to be capable of being adjusted to any proper oblique angle to bring the carpet in contact with the beaters; and Third, in the manner of adjusting the cylinders, whereby the proper tension of the carpet is obtained.

To enable others skilled in the art to construct and use our invention, we will proceed to describe the same with reference to the drawing.

$A\ A^2$ represents the frame, which may be as shown, or may be of any suitable form of construction that will receive the working parts of the machine.

$B\ B^2$ represents the cylinders that receive the carpet, which revolve upon bearings secured in boxes 1 2 3 4, attached to the sides of the posts of the frame by means of bolts $f\ f\ f\ f$ passing through slots or mortices $i\ i\ i\ i$ cut therein, thus admitting of said cylinders being raised or lowered and firmly held at any given point.

$B^3$ represents a third cylinder, which revolves upon bearings resting within the posts of the frame.

Attached to, and suspended from, said bearings is apron D, so arranged as to admit of an oscillating movement, and is held at any proper adjusted angle by means of stirrups $F\ F^2$ pivoted to its end and lower edge, and secured to the inner sides of the posts by bolts passing through slots $e\ e$ cut therein. Said apron may be constructed of wood, covered, on the side coming against the carpet, with wire-cloth of any desired size and texture.

G represents a system of rotating fans that is attached to shaft $G^2$.

Said shaft revolves upon bearings secured in the upper end of posts $A\ A^2$ of the frame, and is provided, at its end, with pulley H, to which is applied the power for operating the fan.

The outer edges of said fans are perforated at graduated distances to receive a series of beaters, L. Said beaters may be constructed of twine or rope of any desired size.

Our machine is operated as follows:

Carpet M is placed around cylinder $B^2$, the end carried upward over cylinder $B^3$, thence downward over the oblique surface of apron D, and around cylinder B. Boxes 1 2 3 4 are then adjusted, giving the proper tension to the carpet. Fan G and said cylinders are then given a rotating motion, which conveys the carpet from cylinder $B^2$ to and around cylinder B, thus bringing the same in contact with the beaters H of fan G, whereby the dust is loosened and removed by the current from the fan.

Having thus described the nature and object of our invention,

What we claim as new, and desire to secure by Letters Patent, is—

1. The rotating fan G, when provided with a series of beaters, H, and arranged to operate substantially as and for the purpose specified.

2. The adjustable apron D, arranged to operate substantially as and for the purpose set forth.

3. The adjustable boxes 1 2 3 4, in combination with the cylinders B, $B^2$, and $B^3$, the whole arranged substantially in the manner and for the purpose specified.

ROBERT TERRY.
FREDERICK W. HAFKEMEYER.

Witnesses:
G. H. FROST,
N. H. SHERBURNE.